United States Patent
Kim et al.

(10) Patent No.: US 12,042,106 B2
(45) Date of Patent: Jul. 23, 2024

(54) MOVABLE ELECTRONIC APPARATUS

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Sungjin Kim, Foshan (CN); Pin Yang, Foshan (CN); Shuyun Wu, Foshan (CN); Xinjian Huang, Foshan (CN); Guangli Xu, Foshan (CN); Junge Zhang, Foshan (CN); Geng Yu, Foshan (CN); Jiefeng Cheng, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

(*) Notice: Subject to any disclaimer, the term of this patent is extended or adjusted under 35 U.S.C. 154(b) by 594 days.

(21) Appl. No.: 17/289,222

(22) PCT Filed: Nov. 9, 2018

(86) PCT No.: PCT/CN2018/114874
§ 371 (c)(1),
(2) Date: Apr. 27, 2021

(87) PCT Pub. No.: WO2020/093381
PCT Pub. Date: May 14, 2020

(65) Prior Publication Data
US 2021/0389772 A1    Dec. 16, 2021

(51) Int. Cl.
*A47L 11/24*    (2006.01)
*A47L 11/40*    (2006.01)
(Continued)

(52) U.S. Cl.
CPC ......... *A47L 11/24* (2013.01); *A47L 11/4002* (2013.01); *A47L 11/4011* (2013.01);
(Continued)

(58) Field of Classification Search
CPC .................................................. A47L 2201/06
(Continued)

(56) References Cited

U.S. PATENT DOCUMENTS

2007/0285041 A1*  12/2007  Jones ................. G05D 1/0242
                                                         901/1
2010/0063628 A1    3/2010   Landry et al.
(Continued)

FOREIGN PATENT DOCUMENTS

CN          1247987 A     3/2000
CN          2387537 Y     7/2000
(Continued)

OTHER PUBLICATIONS

International search report, application No. PCT/CN2018/114874 mailed Jul. 25, 2019 (11 pages).
(Continued)

*Primary Examiner* — Eric D Lee (57) ABSTRACT

A movable electronic apparatus includes a mobile apparatus body, a contact-type detection apparatus and a control circuit. The mobile apparatus body is provided with an electrical drive assembly that drives the mobile apparatus body to move; the contact-type detection apparatus is mounted on the mobile apparatus body, and the contact-type detection apparatus is configured and when the contact-type detection apparatus contacts dispersed dirt, an electrical signal outputted by the contact-type detection apparatus changes; the control circuit is mounted on the mobile apparatus body, and the control circuit is configured to determine whether the dispersed dirt is detected according to the magnitude of the
(Continued)

amount by which the electrical signal outputted by the contact-type detection apparatus changes, and to control the electrical drive assembly to drive the mobile apparatus body to execute a dirt dispersion prevention action when determined that dirt that may be dispersed is detected.

17 Claims, 4 Drawing Sheets

(51) Int. Cl.
  *G01N 27/22* (2006.01)
  *G05D 1/00* (2006.01)
  *G05D 1/648* (2024.01)
  *G06V 20/10* (2022.01)

(52) U.S. Cl.
  CPC ....... *A47L 11/4036* (2013.01); *A47L 11/4061* (2013.01); *A47L 11/4066* (2013.01); *G01N 27/221* (2013.01); *G05D 1/0219* (2013.01); *G05D 1/6486* (2024.01); *G06V 20/10* (2022.01); *A47L 2201/04* (2013.01); *A47L 2201/06* (2013.01)

(58) Field of Classification Search
  USPC .......................................... 716/111
  See application file for complete search history.

(56) References Cited

U.S. PATENT DOCUMENTS

| | | | | |
|---|---|---|---|---|
| 2015/0283699 A1* | 10/2015 | Morin | ....................... | B25J 9/142 901/22 |
| 2017/0090456 A1* | 3/2017 | Mao | ....................... | G05D 1/0246 |

FOREIGN PATENT DOCUMENTS

| CN | 102313622 | A | 1/2012 |
|---|---|---|---|
| CN | 103672104 | A | 3/2014 |
| CN | 204882442 | U | 12/2015 |
| CN | 106333631 | A | 1/2017 |
| CN | 106725127 | A | 5/2017 |
| CN | 107015023 | A | 8/2017 |
| CN | 206403712 | U | 8/2017 |
| CN | 107580467 | A | 1/2018 |
| CN | 206892662 | U | 1/2018 |
| CN | 107782674 | A | 3/2018 |
| JP | H04158224 | A | | 6/1992 |
| JP | 2005211497 | A | * | 8/2005 |
| JP | 2005211497 | A | | 8/2005 |
| JP | 2010017428 | A | | 1/2010 |
| JP | 2010092419 | A | | 4/2010 |
| JP | 2014029315 | A | | 2/2014 |
| JP | 2018000518 | A | | 1/2018 |
| JP | 2018086499 | A | | 6/2018 |
| JP | 2018515191 | A | | 6/2018 |
| JP | 2018143649 | A | | 9/2018 |
| KR | 20120106772 | A | | 9/2012 |
| KR | 101670419 | B1 | | 10/2016 |
| KR | 101689763 | B1 | | 12/2016 |
| KR | 20170047790 | A | | 5/2017 |

OTHER PUBLICATIONS

Request for the Submission of an Opinion, KR application No. 10-2021-7014043 mailed Aug. 12, 2022 (13 pages).
Notice of Reasons for Refusal, JP application No. 2021-524450 mailed Jul. 5, 2022 (9 pages).
The Second Office Action received in the priority Chinese application 201880039906.0, mailed on Mar. 16, 2023.
The Notice of Allowance received in the counterpart Korean application 10-2021-7014043, mailed on Oct. 17, 2022.
Decision to Grant a Patent received in the counterpart Japanese application 2021-524450, mailed on Jan. 24, 2023.
European Partial Search Report, European application No. 18939645.0 mailed Sep. 7, 2021 (15 pages).
Rejection decision received in the priority Chinese application 201880039906.0, mailed on Sep. 29, 2023.
First OA received in CN Application No. 201880039906.0; mailed Sep. 5, 2022.
Third OA received in CN Application No. 201880039906.0; mailed Jun. 10, 2023.

* cited by examiner

MOVABLE ELECTRONIC APPARATUS

CROSS-REFERENCES TO RELATED APPLICATIONS

The present disclosure is a national phase application of International Application No. PCT/CN2018/114874, filed on Nov. 9, 2018, the entireties of which are herein incorporated by reference.

FIELD

The present disclosure relates to the field of waste detection, and in particular to a movable electronic apparatus.

BACKGROUND

With the development of electric technology, there are many electronic devices, such as electronic toys, cleaning robots, etc., which enable people to have convenient lives.

Taking the cleaning robot as an example, as the cleaning robot in the art does not have the function of waste detection, when diffusible waste are present on the ground, such as pet feces, flowing media (such as soup, porridge, tomato sauce and other sauces), liquid (such as water, oil) and other objects with viscosity or diffusibility, using the cleaning robot to clean the ground may cause these types of waste to adhere to the cleaning robot, and the waste may be spread to surrounding areas, which may expand the contaminated area.

SUMMARY

The present application provides a contact detection device, which aims to avoid the problem of spreading the waste to the surrounding area and expanding the contamination area.

In order to solve the above problem, the present disclosure provides a movable electronic apparatus including following components.

A body portion includes an electronic driving assembly configured to drive the body portion to move.

A contact detection device is mounted on the body portion and configured to change an output electric signal in response to the contact detection device contacting diffusible waste.

A control circuit is mounted on the body portion, and configured to determine whether the diffusible waste is detected based on magnitude of a change in the electric signal output by the contact detection device and to control the electronic driving assembly to drive the body portion to perform an operation of preventing the diffusible waste from spreading in response to the diffusible waste is detected.

In an embodiment, the contact detection device includes a detection output circuit, a positive electrode connected to the detection output circuit, and a negative electrode connected to the detection output circuit.

The detection output circuit is configured to supply a positive electric signal to the positive electrode and supply a negative electric signal to the negative electrode.

The detection output circuit is further configured to detect the change in the electric signal output in response to the positive electrode and the negative electrode being conductive to each other via the diffusible waste.

In an embodiment, the detection output circuit is an impedance detection circuit, and the impedance detection circuit is configured to output a corresponding electric signal based on an impedance between the positive electrode and the negative electrode.

In an embodiment, the detection output circuit is a resistance detection circuit, and the resistance detection circuit is configured to output a corresponding electric signal based on a resistance between the positive electrode and the negative electrode.

In an embodiment, the detection output circuit is a capacitance detection circuit, and the capacitance detection circuit is configured to output a corresponding electric signal based on a capacitance between the positive electrode and the negative electrode.

In an embodiment, the capacitance detection circuit includes a crystal oscillation circuit, a first resistor, a first inductor, a first capacitor, and a first detection signal output end.

A first end of the first resistor is connected to an output end of the crystal oscillation circuit, a second end of the first resistor is connected to the first detection signal output end; the second end of the first resistor is further connected to a first end of the first inductor; a second end of the first inductor is connected to the ground; the first capacitor is connected in parallel to the first and the second ends of the first inductor; the positive electrode is connected to the first end of the first inductor; and the negative electrode is connected to the second end of the first inductor.

In an embodiment, the contact detection device includes following components.

A first odor sensor is mounted on a bottom or a circumferential side of the body portion and connected to the control circuit.

The first odor sensor is configured to change an output odor detection signal in response to the first odor sensor contacting the diffusible waste.

In an embodiment, the contact detection device further includes following components.

A second odor sensor is mounted on a top of the body portion and connected to the control circuit.

The second odor sensor is configured to change the odor detection signal output by the first odor sensor in response to odor being detected.

The control circuit is further configured to determine whether the diffusible waste is detected based on a differential detection signal of the first odor sensor and the second odor sensor.

In an embodiment, the contact detection device includes following components.

A heating assembly is mounted on the body portion and connected to the control circuit.

The control circuit is further configured to control the heating assembly to heat the diffusible waste in response to the first odor sensor contacting the diffusible waste.

In an embodiment, the contact detection device includes following components.

A moisture sensor is mounted on a bottom or a circumferential side of the body portion.

The moisture sensor is configured to change an output moisture detection signal in response to the moisture sensor contacting the diffusible waste.

In an embodiment, the contact detection device includes following components.

A temperature sensor is mounted on a bottom or a circumferential side of the body portion.

The temperature sensor is configured to change an output temperature detection signal in response to the temperature sensor contacting the diffusible waste.

In an embodiment, the contact detection device includes following components.

A hardness sensor is mounted on a bottom or a circumferential side of the body portion.

The hardness sensor is configured to change an output hardness detection signal in response to the hardness sensor contacting the diffusible waste.

In an embodiment, the contact detection device includes following components.

A weight sensor is mounted on a bottom or a circumferential side of the body portion.

The weight sensor is configured to change an output weight detection signal in response to the weight sensor contacting the diffusible waste.

In an embodiment, the contact detection device includes following components.

A piezoelectric sensor is mounted on a bottom or a circumferential side of the body portion.

The piezoelectric sensor is configured to change an output piezoelectric detection signal in response to the piezoelectric sensor contacting the diffusible waste.

In an embodiment, the contact detection device includes following components.

A strain sensor is mounted on a bottom or a circumferential side of the body portion.

The strain sensor is configured to change an output strain detection signal in response to the strain sensor contacting the diffusible waste.

In an embodiment, the contact detection device includes following components.

A photoelectric sensor is mounted on a bottom or a circumferential side of the body portion.

The photoelectric sensor is configured to change an output photoelectric detection signal in response to the photoelectric sensor contacting the diffusible waste.

In an embodiment, the contact detection device includes following components.

A spectrum analysis sensor is mounted on a bottom or a circumferential side of the body portion and connected to the control circuit.

The spectrum analysis sensor is configured to change an output spectrum signal in response to the spectrum analysis sensor contacting the diffusible waste.

In an embodiment, the body portion includes a cleaning assembly, the contact detection device includes following components.

An image capturing device is mounted on the body portion and connected to the control circuit.

The image capturing device is configured to capture an image for the cleaning assembly and output a detection signal in response to the cleaning assembly contacting the diffusible waste.

In an embodiment, controlling the electronic driving assembly to drive the body portion to perform an operation of preventing the diffusible waste from spreading includes: controlling the electronic driving assembly to drive the body portion to stop moving.

In an embodiment, the movable electronic apparatus further includes following components.

A direction positioning device is mounted on the body portion and connected to the control circuit.

The direction positioning device is configured to obtain position information of the diffusible waste.

The control circuit is further configured to control the electronic driving assembly to drive the body portion to move to a position of the diffusible waste based on the position information of the diffusible waste, and the contact detection device performs contact detection on the diffusible waste.

In addition, or In one embodiment, the present disclosure may include following embodiments.

The contact detection device forms detection areas on the body portion.

The control circuit is further configured to determine a direction based on positions of the plurality of detection areas in response to the diffusible waste being detected.

In an embodiment, the movable electronic apparatus further includes following components.

A spraying device is mounted on the body portion and connected to the control circuit.

The spraying device is configured to spray deodorant, a fragrance agent, an antiseptic agent or a quick-freezing agent.

The control circuit is further configured to control the spraying device to spray the deodorant, the fragrance agent, the antiseptic agent or the quick-freezing agent in response to the diffusible waste being detected.

In an embodiment, the movable electronic apparatus further includes following components.

A wireless communication device is mounted on the body portion and connected to the control circuit.

The control circuit is further configured to provide feedback of detection information to a user through the wireless communication device in response to the diffusible waste being detected, allowing the user to confirm the detection information and to return a confirmation result, and the control circuit is further configured to control the electronic driving assembly based on the confirmation result returned from a mobile terminal of the user.

In an embodiment, the movable electronic apparatus further includes following components.

A prompt device is mounted on the body portion and connected to the control circuit.

The control circuit is further configured to control the prompt device to output a prompt signal or send the prompt signal to a mobile terminal of a user in response to the diffusible waste being detected.

In an embodiment, the movable electronic apparatus further includes following components.

A cleaning assembly is mounted on the body portion and connected to the control circuit.

The control circuit is further configured to control the cleaning assembly to clear the diffusible waste in response to the diffusible waste being detected.

In an embodiment, the control circuit is further configured to control the electronic driving assembly to drive the body portion to perform a detection operation in response to magnitude of a change in the electric signal output by the contact detection device being greater than or equal to a preset threshold, and the contact detection device contacts the diffusible waste for times.

In an embodiment, the movable electronic apparatus is a cleaning robot.

In an embodiment, the movable electronic apparatus further includes following components.

A laser ladar is mounted on the body portion and connected to the control circuit.

The control circuit has an obstacle avoiding function and is configured to avoid the diffusible waste based on the diffusible waste detected by the laser ladar in an obstacle avoiding mode.

According to the present disclosure, a contact detection device may be configured on a body portion of the movable electronic apparatus to perform contact detection on diffusible waste (oil, soup, porridge, animal feces, porridge, sauces, etc.). When it is determined that the waste is detected, the user may be reminded in time to clean the waste or to control the movable electronic apparatus to perform an operation of preventing the spread of waste. In this way, the waste may be prevented from being adhered to the movable electronic device and being spread to other places to expand the contaminated area. As the contact detection is performed, detection accuracy may be improved, and a situation of miscontrolling may not occur.

BRIEF DESCRIPTION OF THE DRAWINGS

In order to more clearly explain the embodiments of the present application, the accompanying drawings for the embodiments will be briefly introduced hereinafter.

Embodiments of the present disclosure will further be illustrated by referring to disclosure and accompanying drawings.

DETAILED DESCRIPTION OF THE DISCLOSURE

The technical solutions of the embodiments of the present disclosure will be described clearly and completely with reference to the accompanying drawings. The described embodiments show only a part of, but not all of, the embodiments of the present disclosure.

It should be noted that all directional indication (such as up, down, left, right, front, back, etc.) in the embodiments of the present disclosure are only used to explain relative positions between various components, motion of a component, and so on, in a certain posture (as shown in the drawings). When the posture changes, the directional indication may change accordingly.

In addition, the descriptions related to "first", "second", etc. are for descriptive purposes only, and cannot be understood as indicating or implying relative importance or implicitly indicating the number of indicated features. Thus, the features defined with "first" and "second" may include at least one of the features explicitly or implicitly.

People may face such troubles in their daily lives when viscous or diffusible waste is present on the floor of a room (such as animal feces, flowing media (such as soup, porridge, tomato sauce and other sauces), liquid (such as water and oil)) and is not cleaned in time, and when children in the room are playing electronic toys or the cleaning robot, these types of waste may be spread to the surrounding area, causing large-scale contamination and causing large-scale proliferation of bacteria. Especially for families having pets at home, when the cleaning robot is working, the entire indoor rooms may be cleaned, the pet waste, such as feces, may be spread to reach the entire room. Difficulty and cost of cleaning may be increased, and odors and bacteria may be generated and may significantly affect lives of the family, especially when no one is at home, and the cleaning robot is initiated for cleaning automatically without monitoring. Such the situation also causes conflicts between keeping pets and using the movable electronic apparatus such as the cleaning robot.

To solve the above problem, the present disclosure provides a movable electronic apparatus. The movable electronic apparatus may be a cleaning robot for cleaning waste (the waste herein refers to dust, peel, paper scraps, etc.), or an electronic toy, or a movable apparatus configured to detect diffusible waste. The movable apparatus may constantly move in the room to detect waste, in order to remind the user or control the movable electronic apparatus to stop working, preventing the waste from being spread and the contamination area from being expanded. Detailed structure of the movable electronic apparatus will be described in the following.

Figure 1:
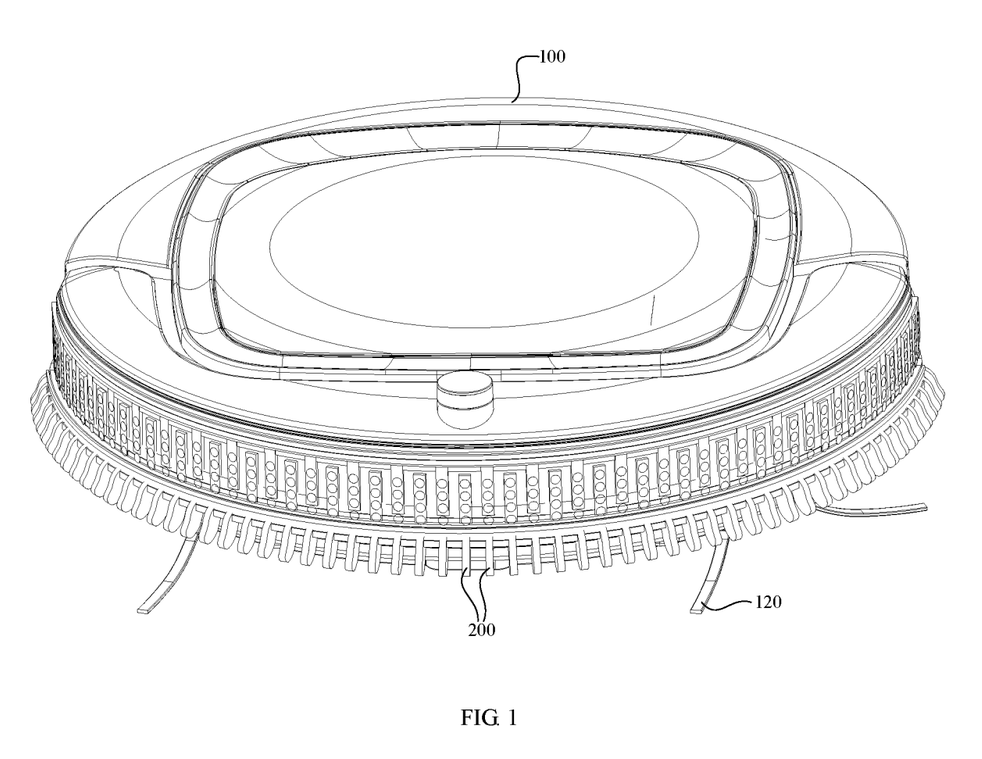
FIG. 1 is a structural schematic view of a movable electronic apparatus according to an embodiment of the present disclosure.
Figure 2:
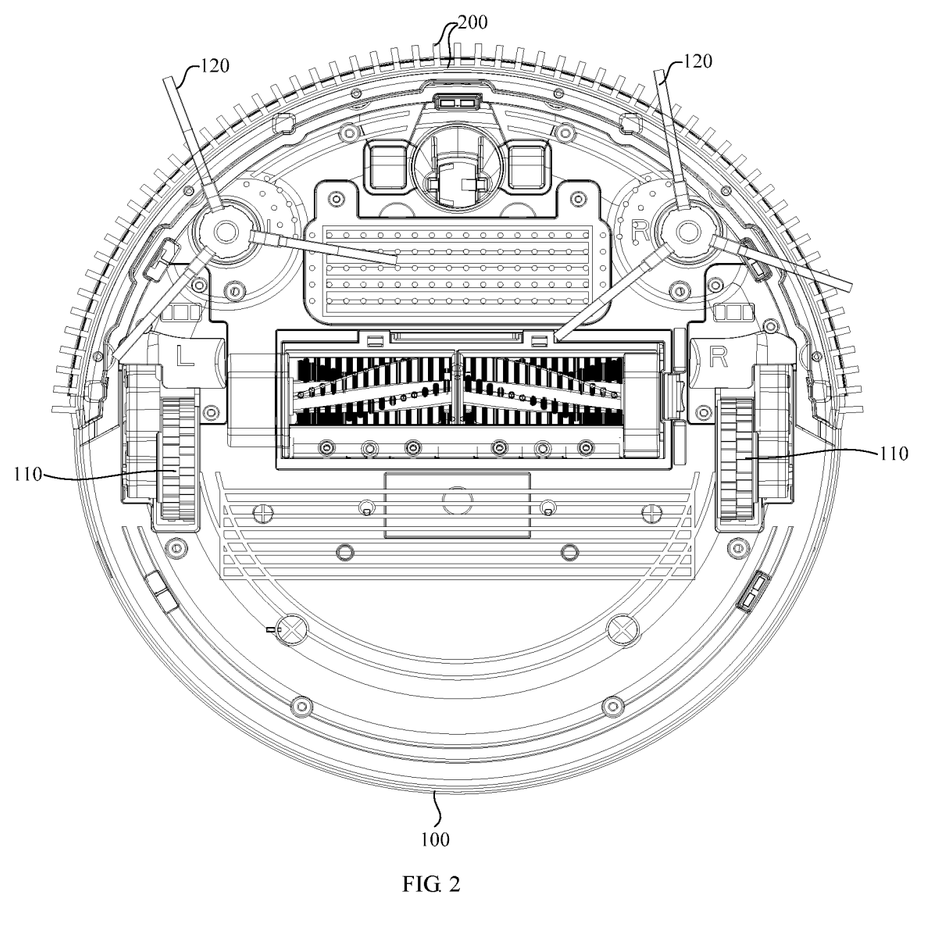
FIG. 2 is another view of the movable electronic apparatus shown in FIG. 1.
Figure 3:
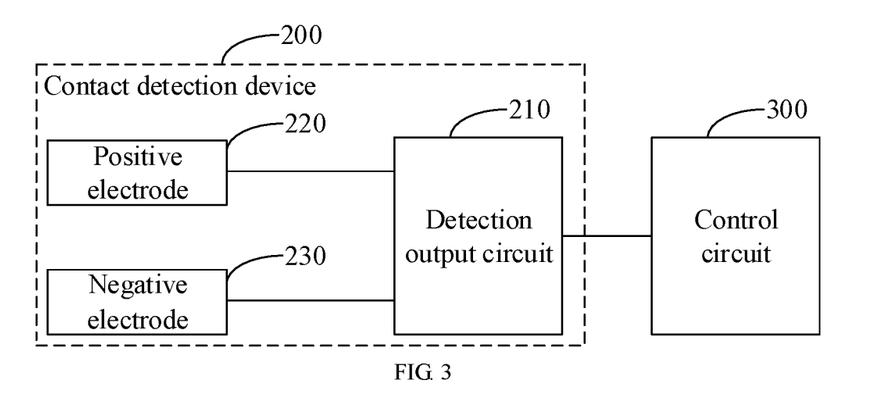
FIG. 3 is a schematic view of functional devices of a contact detection device and a control circuit according to an embodiment of the present disclosure.

As shown in FIGS. 1 to 3, in an embodiment of the present disclosure, a movable electronic apparatus is provided and includes: a body portion 100, a contact detection device 200 and a control circuit 300. The body portion 100 has an electronic driving assembly to drive the body portion 100 to move. The contact detection device 200 and the control circuit 300 are mounted on the body portion. The electronic driving assembly may include a battery (not shown in the figure), a motor (not shown in the figure), and a drive wheel 110. The motor may drive the drive wheel 110 to rotate to control the body portion 100 to move. In one embodiment, other assemblies may be configured and may be controlled by the motor to drive the body portion 100 to move. The control circuit 300 may be a microprocessor or a microcontroller circuit, etc.

In the present embodiment, the contact detection device 200 may be configured to change the electric signal output by the contact detection device 200 when the contact detection device 200 contacts the diffusible waste.

A change in the electric signal output by the contact detection device 200 may be a change in the output electric signal caused by a change in impedance, resistance, capacitance, inductance, pressure, temperature, and moisture of the contact detection device 200. It should be understood that when the contact detection device 200 does not contact the diffusible waste, an output of the contact detection device 200 may be a constant value. When the contact detection device 200 contacts the diffusible waste, the impedance, the resistance, the capacitance, the inductance, the pressure, the temperature, and the moisture of the contact detection device 200 may change accordingly, and thus the output electric signal may change. In this way, as long as the electric signal output by the contact detection device 200 changes, it may be determined that the diffusible waste is present. In order to ensure the accuracy of the detection, while analyzing the detection result, a corresponding reference value or threshold value may be set for comparison to avoid false detection caused by other factors.

In the present embodiment, the control circuit 300 may be configured to determine whether the diffusible waste is detected based on magnitude of the change in the electric signal output by the contact detection device 200. When the magnitude of the change in the electric signal output by the contact detection device 200 is less than a preset threshold, it may be determined that no diffusible waste is detected. When the magnitude of the change in the electric signal output by the contact detection device 200 is greater than or equal to the preset threshold, it may be determined that the diffusible waste is detected. When the control circuit 300 determines that the diffusible waste is detected, the control circuit 300 may control the electronic driving assembly to drive the body portion 100 to perform an operation to prevent the waste from spreading. In this way, the waste may be prevented from being adhered to the movable electronic apparatus and spreading to other locations, and the contaminated area may not be expanded. Further, the proliferation of bacteria may be reduced, and the difficulty and the cost of cleaning may be reduced, providing convenience to people's lives and solving the conflicts between keeping pets and using the movable electronic apparatus such as the cleaning robot. Controlling the electronic driving assembly to drive the body portion 100 to perform the operation of preventing the waste from spreading may be controlling the electronic driving assembly to drive the body portion 100 to stop moving, or may be controlling the electronic driving assembly to perform a clearing operation on the waste, or may be controlling the electronic driving assembly to spray a quick-freezing reagent on the waste to freeze the waste to prevent the waste from spreading. In one embodiment, other reactions may occur to prevent the waste from spreading, which will not be limited by the present disclosure.

In an embodiment, as shown FIG. 3, the contact detection device 200 may include a detection output circuit 210, a positive electrode 220 connected to the detection output circuit 210, and a negative electrode 230 connected to the detection output circuit 210.

The detection output circuit 210 may be configured to supply a positive electric signal to the positive electrode 220 and a negative electric signal to the negative electrode 230.

The detection output circuit 210 may further be configured to detect a change in the electric signal output when the positive electrode 220 and the negative electrode 230 are electrically conductive by the diffusible waste.

Figure 4:
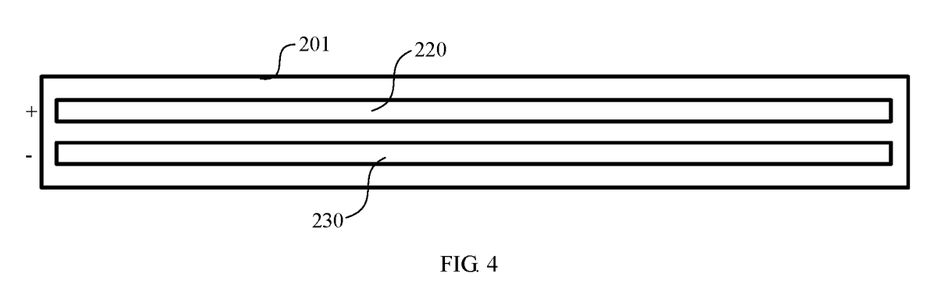
FIG. 4 is a structural schematic view of a positive electrode and a negative electrode of a contact detection device according to an embodiment of the present disclosure.
Figure 5:
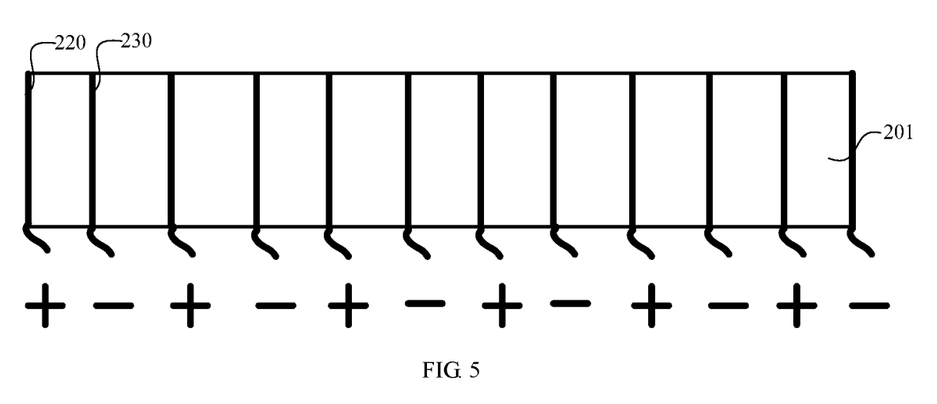
FIG. 5 is a structural schematic view of a positive electrode and a negative electrode of a contact detection device according to another embodiment of the present disclosure.

In the present embodiment, each of the positive electrode 220 and the negative electrode 230 may be a conductive body in any form, which may be flexible or non-flexible. It should be understood that when the contact detection device 200 is mounted on the movable electronic apparatus, and when the conductor is non-flexible, the positive electrode 220 and the negative electrode 230 may be placed with a distance from the ground or placed on a specific platform. In this way, resistance may not be generated between the positive electrode 220, the negative electrode 230, and the ground or the platform while the movable electronic apparatus is moving, and the positive electrode 220 and the negative electrode 230 may not be abraded due to contacting the ground or the platform. However, it may be difficult for liquid waste or very tiny-sized waste to be detected by the non-flexible positive electrode 220 and the non-flexible negative electrode 230, whereas the flexible positive electrode 220 and the flexible negative electrode 230 may directly contact the ground or the specific platform for detection. Therefore, the liquid waste and very tiny-sized waste on the ground or the specific platform may also contact and be detected by the positive electrode 220 and the negative electrode 230. Limited friction may be generated while the flexible positive electrode 220 and the flexible negative electrode 230 contact the ground or the specific platform, additional resistance may not be generated, and the flexible positive electrode 220 and the flexible negative electrode 230 may not be abraded easily. Each of the positive electrode 220 and the negative electrode 230 may be sheet-structured, and may be laid on a carrier 201, as shown in FIG. 4. The carrier may be the body portion 100. In one embodiment, each of the positive electrode 220 and the negative electrode 230 may be rod-shaped or fine hair-shaped. When the movable electronic apparatus is a cleaning robot, the positive and negative electrodes 220 and 230 may be rod-shaped or fine hair-shaped, and may be disposed on the cleaning assembly 120. The rod-shaped or the fine hair-shaped positive and negative electrodes 220 and 230 may be designed as a brush, mounted on the carrier 201, as shown in FIG. 5. It should be noted that the positive electrode 220 and the negative electrode 230 are spaced apart from each other, but also close to each other, and when the positive and the negative electrodes contact the diffusible waste, an electrically conductive path may be formed through the waste. In one embodiment, a distance between the positive electrode 220 and the negative electrode 230 may be 4 mm, 5 mm or 6 mm, which will not be limited by the present disclosure.

When the robot is working, the detection output circuit 210 may supply the positive electric signal to the positive electrode 220, and supply the negative electric signal to the negative electrode 230. When the positive electrode 220 and the negative electrode 230 contact the waste while the cleaning robot is moving, the electrically conductive path may be formed through the waste. At this moment, the electric signal between the positive electrode 220 and the negative electrode 230 may change with respect to the electric signal there between when the conductive path is not formed. The magnitude of the change in the electric signal may be assessed to determine whether the waste is detected.

In the present embodiment, the change in the electric signal between the positive electrode 220 and the negative electrode 230 may refer to the change in the resistance, capacitance, impedance or inductance between the positive electrode 220 and the negative electrode 230.

In an embodiment, the detection output circuit 210 may be a resistance detection circuit, and the resistance detection circuit outputs a corresponding electric signal based on the magnitude of the resistance between the positive electrode 220 and the negative electrode 230.

It should be understood that when the positive electrode 220 and the negative electrode 230 contact the waste to form the conductive path, the positive electrode 220 and the negative electrode 230 may be equivalent to a resistor. It may be determined whether the waste is detected by detecting the equivalent resistance through the circuit. Resistance detection may be achieved in various ways. A voltage division circuit may be formed by a resistor and the resistor between the positive electrode 220 and the negative electrode 230, and voltage division detection may be performed. In one embodiment, a double-threshold comparison circuit may be configured as the resistance detection circuit for resistance detection. An upper threshold and a lower threshold may be obtained by proportional voltage dividing based on a resistance range of the pet feces. When the electrode contacts the pet feces, a comparison voltage output by the double threshold comparison circuit may be between the upper and lower thresholds, so that the control circuit 300 may detect the pet feces. In one embodiment, the same function may be achieved by taking the microcontroller to sample the output signal of the double threshold comparison circuit and compare the signal with the upper and lower thresholds. The double threshold comparison circuit may be implemented using a Schmitt comparator. Using the double threshold comparison circuit may allow high precision and high accuracy. It should be noted that the resistance may be selected based on a resistance property of the diffusible waste. In one embodiment, for pet feces, the resistance of the pet feces may be in a range of tens to hundreds of kilo-ohms. When the feces are placed and dried for days, the resistance may increase to reach a range of tens of megohms. In the present embodiment, the distance between the positive electrode 220 and the negative electrode 230 may be 5 mm to allow the resistor to match the resistance of pet feces better, and the accuracy of detection may be improved.

In an embodiment, the detection output circuit 210 may be a capacitance detection circuit, and the capacitance detection circuit may output a corresponding electric signal based on the magnitude of the capacitance between the positive electrode 220 and the negative electrode 230.

It should be understood that when the positive electrode 220 and the negative electrode 230 contact the waste to form the conductive path, the positive electrode 220 and the negative electrode 230 may be equivalent to a capacitor. When the positive and negative electrodes contact the waste, the equivalent capacitor C2 between two ends of the positive and negative electrodes may change relative to a normal situation, and the final output signal of the capacitance detection circuit may also be changed, and in this way, the waste detection may be achieved. That is, in the present embodiment, electrodes with a geometric structure may be disposed on a surface of the cleaning robot that may contact the waste, and the electrodes may form a capacitance sensor. When the electrodes are excited by a signal of a frequency, there may be a proportional relationship between the capacitance of the electrodes and a dielectric constant of the waste that contacts the two electrodes. As the dielectric constant of water at room temperature may be approximately 81, which may be much greater than that of various general substances. When there is much water in the waste, the dielectric constant of the waste may increase accordingly. While detecting, a capacitance value given by a moisture sensor may also increase. Based on the correspondence between the capacitance of the sensor and moisture of the waste, a threshold may be set. In this way, wet waste may be detected, and metal and non-metal waste can be distinguished based on phase information.

Figure 6:
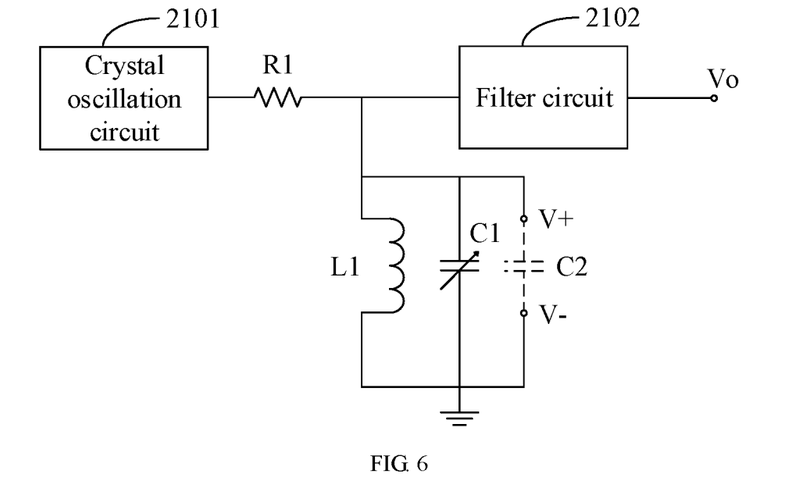
FIG. 6 is a structural schematic view of a circuit of a contact detection device according to an embodiment of the present disclosure.

In an embodiment, as shown in FIG. 6, the capacitance detection circuit may include a crystal oscillation circuit 2101, a first resistor R1, a first inductor L1, a first capacitor C1 and a first detection signal output end Vo.

A first end of the first resistor R1 may be connected to an output end of the crystal oscillator circuit 2101. A second end of the first resistor R1 may be connected to the first detection signal output end Vo. The second end of the first resistor R1 may further be connected to the first end of the first inductor L1. A second end of the first inductor L1 may be connected to the ground. The first capacitor C1 may be connected in parallel to both ends of the first inductor L1. The positive electrode 220 may be connected to the first end of the first inductor L1. The negative electrode 230 may be connected to the second end of the first inductor L1.

In this circuit, the positive and negative electrodes may be represented by the symbols V+ and V− respectively. The crystal oscillator circuit 2101 may provide an oscillation signal. When no waste contacts or comes close to the positive and negative electrodes V+ and V− of the capacitor, a value of the first capacitor C1 may be adjusted to allow an inherent frequency of a parallel resonant circuit composed of the first inductor L1 and the first capacitor C1 to be equal to a crystal oscillation frequency, and the circuit presents maximum impedance. When the waste having moisture contacts or comes close to the positive and negative electrodes V+ and V− of the capacitor, a value of the positive and negative electrode capacitance (equivalent capacitance C2) may change, causing the circuit to be detuned, thus reducing an output voltage. The value of the positive and negative electrode capacitance may change as the moisture of the waste changes, and the output voltage may also change as the moisture of the waste changes. Therefore, capacitive detection of the waste having moisture may be achieved by setting a threshold value.

In addition, a filter circuit 2102 may be configured in addition to the embodiment of the capacitance detection circuit, and the filter circuit 2102 may be connected to the first detection signal output end Vo to filter the output electric signal to improve the accuracy of the detection.

In one embodiment, the detection output circuit 210 may be an impedance detection circuit, and the impedance detection circuit may output a corresponding electric signal based on the magnitude of the impedance between the positive electrode 220 and the negative electrode 230. The impedance may include the capacitance, the resistance and the inductance components. Any two components of the capacitance, resistance and inductance may be detected and analyzed comprehensively to improve detection accuracy. More detail may refer to the principle of resistance and capacitance detection, which will not be described in further detail hereinafter.

In an embodiment, the contact detection device 200 may include following components.

A first odor sensor (not shown in the figure) may be disposed on a bottom or a circumferential side of the body portion 100. The first odor sensor may be connected to the control circuit 300.

The first odor sensor may be configured to change the output odor detection signal when contacting the diffusible waste.

In the present embodiment, the odor sensor may be configured to contact the diffusible waste to achieve waste detection. As some kinds of waste has limited smell, when the waste and the sensor are spaced apart in a distance, the waste may not be detected accurately, and other smells in the air may cause false detection. When the odor sensor contacts the diffusible waste, on one hand, the detection distance may be closer, and on the other hand, the sensor may contact the diffusible waste, and the smell of the waste may be released to facilitate detection.

When the first odor sensor contacts the diffusible waste while the movable electronic apparatus is moving, an odor detection signal is output in the form of a voltage signal generally. In response to the voltage signal changing in a amount compared to a threshold voltage or a reference voltage, it may be determined that the diffusible waste is detected. The control circuit 300 may obtain the voltage detection signal of the first odor sensor and may preset the reference voltage. That is to say, in response to the voltage detection value of the odor sensor being greater than the preset voltage, it may be determined that the diffusible waste is detected. According to the present embodiment, the waste may be detected by contacting the first odor sensor, a high accuracy of detection may be achieved.

Further, the contact detection device 200 may further include following components.

A second odor sensor (not shown in the figure), mounted on a top of the body portion 100. The second odor sensor may be connected to the control circuit 300.

The second odor sensor may be configured to change the odor detection signal output by the second odor sensor in response to an odor being detected.

The control circuit 300 may further be configured to determine whether the diffusible waste is detected based on a differential detection signal of the first odor sensor and the second odor sensor.

According to the present embodiment, a wrong detection signal may be prevented from being output in response to other smells in the air being detected, which may cause false detection. As when there is gas emitted by non-diffusible waste in the air, the gas may be detected by the first odor sensor. In this case, if it is determined that the waste is detected, then the output may cause a false control, and the movable electric apparatus may not continue to work.

In the present embodiment, the second odor sensor may be disposed on the top of the body portion 100, the differential detection may be achieved by the first odor sensor and the second odor sensor. The detection signal of the second odor sensor may be output to the control circuit 300 for comparison. The false detection may be determined based on the voltage difference between the two output signals. Disposing the second odor sensor on the top of the body portion 100 is to avoid the second odor sensor from contacting the diffusible waste.

Further, the contact detection device 200 may further include following components.

A heating assembly (not shown in the figure) may be mounted on the body portion 100 and connected to the control circuit 300.

The control circuit 300 may further be configured to control the heating assembly to heat the diffusible waste when the first odor sensor contacts the diffusible waste. The heating assembly may be a resistive heating assembly. In one embodiment, the heating assembly may be configured with a device that blows out hot air for heating. In one embodiment, the heating assembly may be configured with other physical heating elements, which will not be limited by the present disclosure.

The diffusible waste may contain a amount of moisture. In order to detect the diffusible waste more effectively, the heating assembly is configured to heat the diffusible waste, the moisture in the waste may be evaporated into a steam, so that it may be easier to detect the waste and improve the detection accuracy.

In an embodiment, the contact detection device 200 may include following components.

A moisture sensor (not shown in the figure) may be mounted on a bottom or a circumferential side of the body portion 100.

The moisture sensor may be configured to change an output moisture detection signal when contacting the diffusible waste.

The diffusible waste may contain a amount of moisture. The diffusible waste may be contacted by the moisture sensor, and the moisture in the diffusible waste may be detected, and presence of the diffusible waste may be determined.

In the present embodiment, the moisture sensor may be a resistive moisture sensor made of polymer compound, such as phenolic resin, polyelectrolyte, and so on. The moisture sensor may be disposed on the surface of the body portion 100. When the diffusible waste, such as pet feces and other wet waste, contacts the moisture sensor on the surface of the body portion 100, a moisture-sensitive resistance value may change, enabling the detection of the waste.

The cleaning robot may be taken as an example for illustration, and a contour shape of the cleaning robot may be circular. Moisture-sensitive resistors may be arranged into a circle and disposed on a bottom outer edge or a lower edge of a side surface of the cleaning robot. When any part of the moisture-sensitive resistors contacts the diffusible waste, characteristics of the diffusible waste, such as the moisture or conductivity, may cause a resistance value of the moisture-sensitive resistor to change, and the output electric signal may change. The control circuit 300 may determine that the pet feces are detected, and may send an instruction to the electronic driving assembly to control the movable electronic apparatus to stop running. In this way, the feces may be prevented from being spread. As the moisture sensor detects the waste by contacting, the high detection accuracy may be achieved.

In an embodiment, the contact detection device 200 may include following components.

A temperature sensor (not shown in the figure) may be mounted on the bottom or the circumferential side of the body portion 100.

The temperature sensor may be configured to change an output temperature detection signal when contacting the diffusible waste.

When the pet feces or hot soup and other diffusible waste spill on the ground, the waste may still exhibit a temperature within a period of time after spilling. Within the period of time, while the movable electronic apparatus is moving, and when the temperature sensor on the movable electronic apparatus contacts the diffusible waste, the temperature sensor may output a temperature detection signal in the form of a voltage signal generally. In response to the voltage signal changing by a amount compared to the threshold voltage or the reference voltage, it may be determined that the diffusible waste is detected. In this way, the control circuit 300 may preset the reference voltage. When the control circuit 300 obtains the voltage detection signal, the control circuit 300 may determine whether the voltage detection value of the temperature sensor is greater than the preset voltage. When the voltage value detected by the temperature sensor is greater than the preset voltage, it may be determined that the diffusible waste is detected. As the waste is detected by contacting the temperature sensor, a high detection accuracy may be achieved.

In an embodiment, the contact detection device 200 may include following components.

A hardness sensor (not shown in the figure) may be mounted on the bottom or the circumferential side of the body portion 100.

The hardness sensor may be configured to change an output hardness detection signal when contacting the diffusible waste.

Whisker-type probes made of PVDF piezoelectric material may be arranged on a surface of the movable electronic apparatus that may contact the waste. A hardness of the waste, such as the pet feces, may be relatively low. A compressive stress generated when the whisker-type probes contact the waste may be relatively low. Therefore, detection of the waste may be achieved based on a range of the output voltage. As the waste is detected by contacting the hardness sensor, a high detection accuracy may be achieved.

In an embodiment, the contact detection device 200 may include following components.

A weight sensor (not shown in the figure) may be mounted on the bottom or the circumferential side of the body portion 100.

The weight sensor may be configured to change an output weight detection signal when contacting the diffusible waste.

The weight sensor may be arranged on the surface of the movable electronic apparatus that may contact the waste. When the bottom contacts the waste such as pet feces, the detection signal output from the weight sensor may change due to the adhesion of the feces, and the waste may be detected. As the waste is detected by contacting the weight sensor, a high detection accuracy may be achieved.

In an embodiment, the contact detection device 200 may further include following components.

A piezoelectric sensor (not shown in the figure) may be mounted on the bottom or the circumferential side of the body portion 100.

The piezoelectric sensor may be configured to change an output piezoelectric detection signal when contacting the diffusible waste.

The piezoelectric sensor may be a piezoelectric oscillator. The piezoelectric sensor may be arranged on the surface of the movable electronic apparatus that may contact the waste. When the piezoelectric oscillator on the movable electronic apparatus contacts the waste such as pet feces, a frequency of the oscillator may change due to the adhesion of the feces, and the waste may be detected. As the waste is detected by contacting the piezoelectric sensor, a high detection accuracy may be achieved.

In an embodiment, the contact detection device 200 may include following components.

A strain sensor (not shown in the figure) may be mounted on the bottom or the circumferential side of the body portion 100.

The strain sensor may be configured to change an output stress detection signal when contacting the diffusible waste. The strain sensor may be a strain sheet and may be arranged on the surface of the movable electronic apparatus that may contact the waste. The equivalent resistance of the strain sheet may change when the waste is adhered, and the waste may be detected. The strain sheet may be made of flexible material to improve detection accuracy and may not be abraded. As the waste is detected by contacting the strain sensor, a high detection accuracy may be achieved.

In an embodiment, the contact detection device 200 may include following components.

A photoelectric detection sensor (not shown in the figure) may be mounted on the bottom or the circumferential side of the body portion 100.

The photoelectric detection sensor may be configured to change an output photoelectric detection signal when contacting the diffusible waste.

Figure 7:
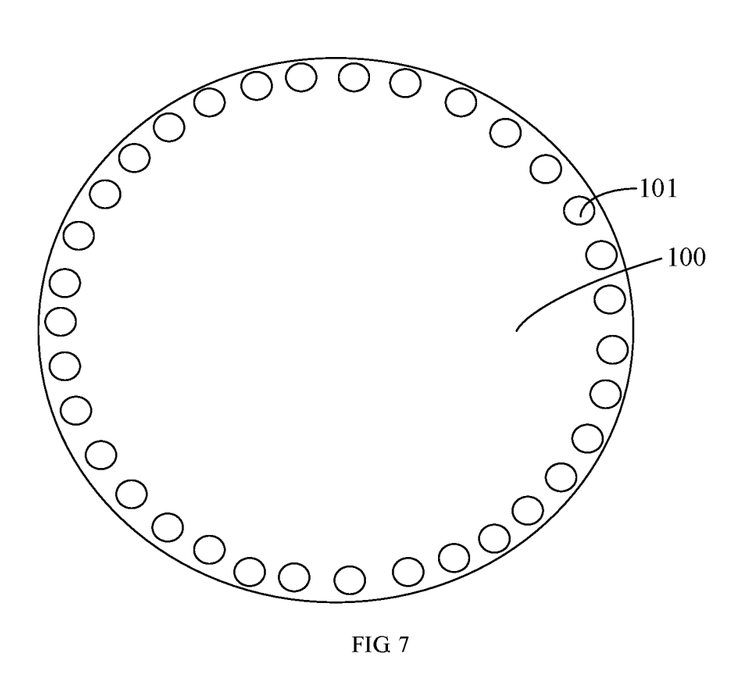
FIG. 7 is a schematic view of a layout of optical windows on a body portion of a movable electronic apparatus according to an embodiment of the present disclosure.

Pet feces or hot soup and other diffusible waste may be adhesive. The photoelectric detection sensor may be disposed on the surface of the movable electronic apparatus that may contact the waste. When the movable electronic apparatus moves to enable the photoelectric detection sensor to contact the waste, the waste may be adhered to the photoelectric detection sensor, and strength of the photoelectric signal output by the photoelectric detection sensor may change, and the waste may be detected. In addition, as shown in FIG. 7, In one embodiment, a bottom surface of the body portion 100 may define optical windows 101. The plurality of optical windows 101 may be fed in parallel to a same photoelectric detection end via optical fibers. The optical windows 101 may be defined on the lower edge of the side surface or the bottom outer edge of the body portion 100. In one embodiment, location of the optical windows 101 may not be limited to the bottom outer edge. The optical windows 101 may be defined on an inner edge of the bottom surface of the body portion 100. As the waste is detected by contacting the photoelectric detection sensor a high detection accuracy may be achieved.

In an embodiment, the contact detection device 200 may include following components.

A spectrum analysis sensor may be mounted on the bottom or the circumferential side of the body portion 100 and may be connected to the control circuit 300.

The spectrum analysis sensor may be configured to change an output spectrum signal when contacting the diffusible waste.

The diffusible waste, such as pet feces or hot soup, may be adhesive. The spectrum analysis sensor may be disposed on the surface of the movable electronic apparatus that may contact the waste. When the movable electronic apparatus moves to enable the spectrum analysis sensor to contact the waste, the waste may be adhered to the spectrum analysis sensor, and a spectrum signal output by the spectrum analysis sensor may change. The control circuit 300 may determine whether the diffusible waste is detected based on spectrum information scanned by the spectrum analysis sensor. As the waste is detected by contacting the spectrum analysis sensor, a high detection accuracy may be achieved.

In an embodiment, the body portion 100 may include a cleaning assembly 120, and the contact detection device 200 may include following components.

An image capturing device may be mounted on the body portion 100, and may be connected to the control circuit 300.

The image capturing device may be configured to capture an image for the cleaning assembly 120 and output a detection signal when the cleaning assembly 120 contacts the diffusible waste.

In the present embodiment, the cleaning assembly 120 may be a brush. The image capturing device may be a camera device in any form. A visible light camera may perform image recognition on a stained portion of the cleaning assembly 120. When the cleaning assembly 120 contacts the waste, an image of the cleaning assembly 120 may be abnormal, and the detection of waste may be recognized. As the cleaning assembly 120 contacts the waste, and the image capturing device may perform image recognition on the stained portion of the cleaning assembly 120, a high detection accuracy may be achieved.

It should be noted that all of the above devices for detecting the waste are contact detection devices 200, which may be more accurate as they contact the waste for detection. In addition, the contact detection devices 200 in various embodiments may be combined to improve the detection accuracy.

In an embodiment, the movable electronic apparatus may further include following components.

A laser ladar may be mounted on the body portion 100 and may be connected to the control circuit 300.

The control circuit 300 may have an obstacle avoiding mode. The control circuit 300 may be configured to avoid the diffusible waste in the obstacle avoiding mode based on the diffusible waste detected by the laser ladar.

In one embodiment, if the movable electronic apparatus may avoid obstacles perfectly, the movable electronic apparatus may avoid contacting the feces. A distance of the obstacle avoidance function of the laser ladar may be greater than that of ultrasound or infrared detection. Therefore, positioning achieved by the laser ladar may be more accurate. The obstacle avoiding function achieved by one group of laser ladars may be equivalent to that achieved by groups of ultrasound sensors or groups of infrared sensors. A small-sized ladar may be disposed on a front side of the movable electronic apparatus to perform detection of obstacles in a moving direction of the movable electronic apparatus. When the obstacle avoiding function is desired to be achieved for 360° of the movable electronic apparatus, the ladar may be disposed on a circumference of the movable electronic apparatus.

It should be understood that in the present embodiment, the movable electronic apparatus may avoid contacting the waste in the obstacle avoiding mode. When the movable electronic apparatus is not in the obstacle avoiding mode, contact detection of the waste may be performed as described in the above embodiments, and the movable electronic apparatus may be controlled more flexible.

In an embodiment, the movable electronic apparatus may further include following components.

A directional positioning device may be mounted on the body portion 100 and may be connected to the control circuit 300.

The directional positioning device may be configured to obtain position information of the diffusible waste.

The control circuit 300 may be configured to control the electronic driving assembly to drive the body portion 100 to move to the position of the diffusible waste based on the position information of the diffusible waste, and the contact detection device 200 may perform contact detection on the diffusible waste.

According to the present embodiment, the position of the waste may be determined, precise detection may be achieved, and the running trajectory of the movable electronic apparatus may be controlled precisely. Further, the movable electronic apparatus may be avoided contacting the waste for times, and the waste may not be spread to other locations.

In an embodiment, the contact detection device 200 may form detection areas on the body portion 100.

The control circuit 300 may further be configured to determine an orientation based on positions of the plurality of detection areas when diffusible waste is detected.

In one embodiment, on the body portion 100, the drive wheel 110 of the electronic driving assembly may be taken as a coordinate origin, and virtual coordinate axes may be established to indicate directions. The contact detection devices 200 may be arranged at corresponding positions based on the virtual coordinate axes. In this way, whenever the corresponding contact detection devices 200 on the virtual coordinate axes detect the waste, a direction of the waste relative to the body portion 100 may be determined. Further, the running direction of the movable electronic apparatus may be controlled.

According to the present embodiment, the position of the waste may be determined, precise detection may be achieved, and a running track of the movable electronic apparatus may be controlled precisely. Further, the movable electronic apparatus may be avoided contacting the waste for multiple times, and the waste may not be spread to other locations. In the present embodiment, a specific positioning device may be arranged to save costs of the apparatus.

In an embodiment, the movable electronic apparatus may further include following components.

A spraying device may be mounted on the body portion 100 and connected to the control circuit 300.

The spraying device may be configured to spray a deodorant, a fragrance agent, an antiseptic agent or a quick-freezing agent.

The control circuit 300 may further be configured to control the spraying device to spray the deodorant, the fragrance agent, the antiseptic agent or the quick-freezing agent when the diffusible waste is detected.

In the present embodiment, in order to reduce the odor released by the waste or reduce the proliferation of bacteria, the spraying device may further be arranged on the removable electronic apparatus. The spraying device may spray any one or a combination of the deodorant, the fragrance agent, the antiseptic agent and the quick-freezing agent. In this way, when the diffusible waste is detected, the deodorant may be sprayed for deodorizing, or the fragrance agent, such as perfume, may be sprayed for deodorizing, or the antiseptic agent or the quick-freezing agent may be sprayed for sterilizing or quick freezing, preventing the proliferation of bacteria or preventing the odor of the waste from spreading.

In an embodiment, the movable electronic apparatus may further include following components.

A wireless communication device may be mounted on the body portion 100 and connected to the control circuit 300.

The control circuit 300 may further be configured to provide feedback of detection information to a user's mobile terminal via the wireless communication device when the diffusible waste is detected, and the user may confirm the detection information and return a confirmation result. The control circuit 300 may further be configured to control the electronic driving assembly of the body portion 100 based on the confirmation result returned from the user's mobile terminal.

The wireless communication device may be a mobile network for remote transmission, or may be WIFI, Bluetooth, and so on, for short-range transmission, which may be set based on the user's choice. According to the present embodiment, the movable electronic apparatus may communicate with the user.

In an embodiment, the movable electronic apparatus may further include following components.

A prompt device may be mounted on the body portion 100 and connected to the control circuit 300.

The control circuit 300 may further be configured to control the prompt device to output a prompt signal or to send a prompt signal to the user's mobile terminal when the diffusible waste is detected.

The prompt signal may be a voice message, a beeping signal of a preset frequency or a light signal, or a combination thereof. Prompting through the prompt device may allow the user to know in time that the waste is present and is to be treated, and the waste may not be untreated for too long which may cause the proliferation of bacteria and cause unfavored odor to be released.

In an embodiment, the movable electronic apparatus may further include following components.

A cleaning assembly may be mounted on the body portion 100 and connected to the control circuit 300.

The control circuit 300 may further be configured to control the cleaning assembly to clean the diffusible waste when the diffusible waste is detected.

The cleaning assembly may be a cleaning cloth or a shovel, and the like. The cleaning assembly may collect the waste and transfer the waste to a predetermined position. The cleaning assembly may be associated with a smart trash bin. Signal interaction may be achieved between the cleaning assembly and the smart trash bin. The collected waste may be transferred automatically into the smart trash bin. Of course, feedback of the waste may be provided to the user's terminal. In this way, the user may perform remote control to transfer the collected waste into the trash bin. For the waste that may not be collected easily, the user may control the apparatus to treat the waste by other means, such as sterilization, deodorizing, and so on.

In an embodiment, in order to improve the detection accuracy, the control circuit 300 may further be configured to control the electronic driving assembly to drive the body portion 100 to perform the detection operation, in response to the amount of change in the electric signal output from the contact detection device 200 being greater than or equal to the preset threshold, and the contact detection device 200 may contact the diffusible waste for multiple times. The detection operation may include controlling the body portion 100 to move backwardly or to rotate, controlling the body portion 100 to contact the waste again or to move back and forth to crush the waste, or a combination thereof. A distance of the body portion 100 moving back and forth may be predetermined, within a range of 5 cm to 20 cm. In this way, inaccurate detection caused by an excessively short distance may be avoided, and spreading the waste caused by an excessively large distance may be avoided.

What is claimed is:

1. A movable electronic apparatus, comprising:
   a body portion, comprising an electronic driving assembly configured to drive the body portion to move;
   a contact detection device, mounted on the body portion and configured to change an output electric signal in response to the contact detection device contacting diffusible waste; and
   a control circuit, mounted on the body portion, and configured to determine whether diffusible waste is detected based on magnitude of a change in the electric signal output by the contact detection device and to control the electronic driving assembly to drive the body portion to perform an operation of preventing the diffusible waste from spreading in response to the diffusible waste being detected;
   wherein the contact detection device comprises a detection output circuit, a positive electrode connected to the detection output circuit, and a negative electrode connected to the detection output circuit;
   the detection output circuit is configured to supply a positive electric signal to the positive electrode and supply a negative electric signal to the negative electrode, and to detect the change in the output electric signal in response to the positive electrode and the negative electrode being conductive to each other via the diffusible waste;
   wherein the detection output circuit is a capacitance detection circuit, and the capacitance detection circuit is configured to output a corresponding electric signal based on capacitance between the positive electrode and the negative electrode;
   wherein the capacitance detection circuit comprises a crystal oscillation circuit, a first resistor, a first inductor, a first capacitor, and a first detection signal output end; wherein
   a first end of the first resistor is connected to an output end of the crystal oscillation circuit;
   a second end of the first resistor is connected to the first detection signal output end and a first end of the first inductor, and a second end of the first inductor is connected to the ground;
   the first capacitor is connected in parallel to the first end and the second end of the first inductor; and
   the positive electrode is connected to the first end of the first inductor, and the negative electrode is connected to the second end of the first inductor.

2. The movable electronic apparatus according to claim 1, wherein the detection output circuit is an impedance detection circuit, and the impedance detection circuit is configured to output a corresponding electric signal based on impedance between the positive electrode and the negative electrode.

3. The movable electronic apparatus according to claim 1, wherein the detection output circuit is a resistance detection circuit, and the resistance detection circuit is configured to output a corresponding electric signal based on resistance between the positive electrode and the negative electrode.

4. The movable electronic apparatus according to claim 1, wherein the contact detection device comprises a first odor sensor, mounted on a bottom or a circumferential side of the body portion and connected to the control circuit,
   wherein the first odor sensor is configured to change an output odor detection signal in response to the first odor sensor contacting the diffusible waste.

5. The movable electronic apparatus according to claim 4, wherein the contact detection device further comprises at least one of a second odor sensor and a heating assembly, the second odor sensor is mounted on a top of the body portion and connected to the control circuit, and the heating assembly is mounted on the body portion and connected to the control circuit,
   wherein the second odor sensor is configured to change the odor detection signal output by the second odor sensor in response to odor being detected;
   the control circuit is further configured to determine whether the diffusible waste is detected based on a differential detection signal of the first odor sensor and the second odor sensor; and
   the control circuit is further configured to control the heating assembly to heat the diffusible waste in response to the first odor sensor contacting the diffusible waste.

6. The movable electronic apparatus according to claim 1, wherein the contact detection device comprises a moisture sensor, mounted on a bottom or a circumferential side of the body portion; and
   the moisture sensor is configured to change an output moisture detection signal in response to the moisture sensor contacting the diffusible waste.

7. The movable electronic apparatus according to claim 1, wherein the contact detection device comprises a temperature sensor, mounted on a bottom or a circumferential side of the body portion,
   wherein the temperature sensor is configured to change an output temperature detection signal in response to the temperature sensor contacting the diffusible waste.

8. The movable electronic apparatus according to claim 1, wherein the contact detection device comprises a hardness sensor, mounted on a bottom or a circumferential side of the body portion,
   wherein the hardness sensor is configured to change an output hardness detection signal in response to the hardness sensor contacting the diffusible waste.

9. The movable electronic apparatus according to claim 1, wherein the contact detection device comprises a weight sensor, mounted on a bottom or a circumferential side of the body portion,
   wherein the weight sensor is configured to change an output weight detection signal in response to the weight sensor contacting the diffusible waste.

10. The movable electronic apparatus according to claim 1, wherein the contact detection device comprises a piezoelectric sensor, mounted on a bottom or a circumferential side of the body portion,
wherein the piezoelectric sensor is configured to change an output piezoelectric detection signal in response to the piezoelectric sensor contacting the diffusible waste.

11. The movable electronic apparatus according to claim 1, wherein the contact detection device comprises a strain sensor, mounted on a bottom or a circumferential side of the body portion,
wherein the strain sensor is configured to change an output strain detection signal in response to the strain sensor contacting the diffusible waste.

12. The movable electronic apparatus according to claim 1, wherein the contact detection device comprises a photoelectric sensor, mounted on a bottom or a circumferential side of the body portion,
wherein the photoelectric sensor is configured to change an output photoelectric detection signal in response to the photoelectric sensor contacting the diffusible waste.

13. The movable electronic apparatus according to claim 1, wherein the contact detection device comprises a spectrum analysis sensor, mounted on a bottom or a circumferential side of the body portion and connected to the control circuit;
wherein the spectrum analysis sensor is configured to change an output spectrum signal in response to the spectrum analysis sensor contacting the diffusible waste.

14. The movable electronic apparatus according to claim 1, wherein
the body portion comprises a cleaning assembly;
the contact detection device comprises an image capturing device, mounted on the body portion and connected to the control circuit;
wherein the image capturing device is configured to capture an image for the cleaning assembly and output a detection signal in response to the cleaning assembly contacting the diffusible waste.

15. The movable electronic apparatus according to claim 1, wherein controlling the electronic driving assembly to drive the body portion to perform an operation of preventing the diffusible waste from spreading comprises: controlling the electronic driving assembly to drive the body portion to stop moving.

16. The movable electronic apparatus according to claim 1, further comprising a direction positioning device, mounted on the body portion and connected to the control circuit,
wherein the direction positioning device is configured to obtain position information of the diffusible waste;
the control circuit is further configured to control the electronic driving assembly to drive the body portion to move to a position of the diffusible waste based on the position information of the diffusible waste, such that the contact detection device performs contact detection on the diffusible waste; and/or
the contact detection device forms a plurality of detection areas on the body portion; and
the control circuit is further configured to determine a direction based on positions of the plurality of detection areas in response to the diffusible waste being detected.

17. The movable electronic apparatus according to claim 1, wherein the control circuit is further configured to control the electronic driving assembly to drive the body portion to perform a detection operation in response to magnitude of a change in the electric signal output by the contact detection device being greater than or equal to a preset threshold, such that the contact detection device contacts the diffusible waste for a plurality of times.

* * * * *